Patented Oct. 5, 1948

2,450,555

UNITED STATES PATENT OFFICE 2,450,555

EXTRACTION OF RUTIN

Harold Freeman Koones, Clifton, N. J., assignor to S. B. Penick & Company, New York, N. Y., a corporation of Delaware No Drawing. Application May 20, 1947, Serial No. 749,355

5 Claims. (Cl. 260—210)

This invention relates to an improvement in the extraction of rutin from plant materials containing it in association with other constituents (hereinafter broadly referred to as impurities) by a process of separation and purification. Such crude materials are buckwheat leaves, rue, tobacco plants, forsythia and the like. My improved method simplifies the manufacture of rutin from these crude materials, and rutin is obtained thereby in highly purified forms useful for instance as a drug. (See J. Q. Griffith et al, Effect of rutin on increased capillary fragility in man, Proc. Soc. Exptl. Biol. and Med., vol. 55, No. 3, pps. 228–9, 1944.)

The difficulties of isolating pure rutin from the crude materials are illustrated by the work of Roderick K. Eskew and co-workers (Production of rutin from buckwheat leaf meal, Publication AIC–114, United States Department of Agriculture, Eastern Regional Research Laboratories, March, 1946.)

After preparing a crude rutin concentrate from buckwheat leaf meal by extracting the meal with 78% alcohol and evaporating the alcohol, these investigators recrystallized and purified the concentrate three times with boiling water at great dilutions and once with large quantities of alcohol before they obtained a substantially pure rutin therefrom. This procedure is laborious and time-consuming.

My improved method is characterized by the use of water as the sole medium in which the separation and purification steps are performed, even though much of the crude plant material is difficultly soluble therein. The procedure leads from the crude materials to the substantially pure rutin in only a few, easy steps.

I can apply my procedure to the crude material directly or after having pretreated it, for instance in the case of buckwheat leaf meal, by defatting the meal with an organic solvent such as pentane or acetone, extracting from the defatted material an impure rutin with 78% alcohol, evaporating the alcohol and, if necessary, treating the concentrate with an organic solvent such as 30% acetone or benzol to remove impurities soluble therein such as chlorophyll.

SEPARATION

I have discovered that in the presence of a water-soluble borate under the conditions hereinafter described, water will dissolve a portion of the crude material including the rutin and impurities.

A preliminary assay will indicate the quantities of water and borate necessary to dissolve the solubilizable constituents of the crude material. The bulk of the material is then treated with the requisite amount of water and borate to extract all soluble components therefrom.

I have found that in order to perform the solubilizing step effectively and completely, enough borate must be added to bring the pH of the solution up to from about 7.0 to about 10.0. The narrower range of from 7.2 to 7.5 is most advantageous to obtain the desired result.

PURIFICATION

I have further found that the dissolved components can be selectively precipitated from the above solutions in such a manner that when the impurities have been removed, a purified and crystallized rutin is obtained as a final fraction from the solutions. This selective precipitation is based on the discovery that the rutin in the presence of a water-soluble borate remains substantially dissolved in the aqueous solution at pH concentrations above about 5.0, even while purification is performed at these concentrations with the removal of the impurities from the solutions.

Starting with a solution having a pH of, for instance, from 7.2 to 7.5 as above described, I have found that the bulk of the material other than the rutin is precipitated therefrom by a salting-out operation using a soluble salt such as sodium chloride, ammonium sulfate, magnesium chloride, and the like, and can be removed from the solution by filtration. The most advantageous salting-out agent and its optimum quantity can be determined by a preliminary test in each case. A salt concentration of about 20 to 30% and sodium chloride as the agent are particularly satisfactory.

I have discovered that the filtrate from the salted-out material can be substantially freed from the remaining impurities by adjusting the pH of the solution to a slightly acid range, say from 5.2 to 5.5. Addition of a free acid such as hydrochloric acid, acetic acid or phosphoric acid, to within the indicated pH range precipitates these impurities and they can be removed by filtration.

The fitrate is then further acidified to a pH of from 1.0 to 4.0, for instance, by the addition of dilute sulfuric acid, whereupon the pure rutin crystallizes from the aqueous solution.

Instead of removing the impurities from the alkaline solution by precipitation as above described, they can be extracted therefrom with water-immiscible solvents such as ether, benzene, chloroform or light petroleum, or they can be adsorbed on finely divided decolorizing agents as for instance, carbon, silica gel, alumina, and the like.

It is well known that quercetin is frequently found to accompany rutin in natural sources such as buckwheat leaf meal, and that is processed with the rutin and occurs as an impurity in the final product when methods of the prior art are used to manufacture rutin. No practical process is known in the prior art of separating this impurity.

I have found that any quercetin present in my borate solutions is precipitated when making the solutions slightly acid. Crude materials which contain quercetin as the chief impurity can thus be purified by dissolving them in aqueous borate solution to a pH range of from 7.2 to 7.5, making the solution acid to a pH of from 5.2 to 5.5, filtering off the precipitate formed thereby, and crystallizing the rutin from the purified solution at a pH from 1.0 to 3.0.

The following examples illustrate my invention:

EXAMPLE I.—PURIFICATION WITH SALTING OUT AGENT IN THE COLD

Step I.—Separaion

A rutin concentrate (derived from buckwheat leaf meal by defatting the meal with pentane, extracting from the defatted material a crude rutin with denatured 78% alcohol, evaporating the alcohol and extracting the concentrate with 30% acetone) is added with stirring at room temperature to a sufficient quantity of 5% aqueous solution of borax to bring the pH of the solution to 7.5. The stirring is continued for half an hour. Practically all the material dissolved at this point except some green pigment.

Step II.—Purification

To the above solution is added enough solid sodium chloride to make a 20% solution and the mass is stirred for 15 minutes. A heavy precipitate of green tars and pigments flocculates which is filtered off through a filter press precoated with supercel (a refined diatomaceous silica) and washed with 20% aqueous sodium chloride solution. The wash liquor is added to the filtrate. The filtrate must be sparkling clear.

The sparkling clear solution is acidified with phosphoric acid to a pH of from 5.2 to 5.5. The solution is filtered through a filter precoated with supercel suspended in 20% sodium chloride solution. When the filtration is complete, the filter is washed with fresh 20% sodium chloride solution, and the wash liquor is added to the filtrate. Care must be taken in the pH adjustment that the pH gets within the range 5.2 to 5.5. If the pH is too high, impurities will not be removed; if it is too low, rutin may separate. The filtrate must be sparkling clear.

Step III.—Crystallization of Rutin

The filtrate from Step II is heated to 50° C. To the well stirred solution is added dilute sulfuric acid or hydrochloric acid to make the pH 1.0 to 1.5. The solution is then cooled and allowed to stand at least overnight at 20° C. or lower. The crystallized rutin is now filtered off and the mother liquor discarded. The rutin on the filter is washed with distilled water until the wash is no longer acid, and gives a faint or negative test for chloride with silver nitrate solution. It is important that the temperature be 50–55° C., before the acid is added to crystallize the rutin. If the solution is too cold, crystals of rutin will not be obtained, the quality will be inferior, and the filtration and washing will be difficult.

The rutin is now ready for drying and milling in the usual manner.

By the process of this example I have manufactured rutin from buckwheat leaf meal in a yield of 96% of the theory. This product assays 95 to 98% rutin when assayed by the spectrophotometric method of Porter, Brice, Couch and Copley of the United States Department of Agriculture (see footnote 11 of the paper by J. Nagshki, W. L. Porter and J. F. Couch "Isolation of rutin from two varieties of forsythia," Journal Am. Chem. Soc. 69 (1947), p. 572).

I have also purified the alkaline solution of Step I above by performing the salting-out operation in a hot solution. The salting-out agent can be added either before or after the crude rutin concentrate was added to the aqueous solution of the borate. In either case, the salt concentration was about 20%, and care was taken that a temperature of from 50 to 60° C. prevailed during the salting-out operation.

EXAMPLE II 100 grams of crude buckwheat leaf meal was heated to boiling with 500 ml. of water. After the solution had cooled to 70° C., 40 grams of borax was added and the mixture filtered after stirring approximately 5 minutes. The buckwheat leaf meal was again suspended in 250 ml. of water heated to 70° C. and filtered again. The two filtrates were combined (500 ml.) and 100 grams of sodium chloride was added and the solution filtered over filtercel, then acidified with phosphoric acid to a pH of 1.8 and filtered again over filtercel. The solution was left over the weekend and the precipitate filtered after 68 hours standing. The precipitate was finally dissolved in 50 ml. of borate solution, acidified with phosphoric acid (pH 1.5) and filtered. Rutin crystallized overnight, was filtered, washed and dried. Yield: 0.1892 gram.

From the foregoing description those skilled in the art will recognize that the separation and purification procedures while broadly limited by the principles which I have discovered and disclosed here, may vary widely in details of execution depending on the nature and the quantity of the impurities present in the crude material.

I have performed the separating step with borate in water at ordinary or elevated temperatures and on crude materials which had (Example I) or had not (Example II) been pretreated to remove certain minor impurities therefrom prior to separation, and I have purified the alkaline borate solutions with or without the aid of salting-out agents at ordinary or elevated temperatures; or I can employ such other alternatives of separation and purification as are suggested in the foregoing description or as are obvious to the expert or as are obvious equivalents of the means specifically disclosed, all of which modifications are intended to be within the scope of my appended claims.

While I have employed buckwheat leaf meal in my above examples, it should be distinctly understood that other rutin-containing crude materials or extracts therefrom such as rue, tobacco plants, forsythia and many others, including green buckwheat will likewise yield purified rutin when treated by my improved separation and purification method, both in fresh and dried form.

What I claim is:

1. An improvement in the production of rutin from plant materials containing it which comprises treating the crude material with water in the presence of a water-soluble borate whereby a portion of the crude material including the rutin is dissolved and adding enough water-soluble borate to bring the pH of the solution up to from about 7.0 to about 10.0, removing impurities from the solution in the pH range from about 10.0 to about 5.0, and adjusting the pH of the purified solution to a pH range of from about 4.0 to about 1.0 whereupon purified rutin crystallizes from the solution.

2. An improvement in the production of rutin from plant materials containing it which comprises treating the crude material with water in the presence of a water-soluble borate whereby a portion of the crude material including the rutin is dissolved and adding enough water-soluble borate to bring the pH of the solution up to from about 7.0 to 10.0, adding a water-soluble salt to the solution whereby impurities are precipitated, filtering off the precipitate and rendering the filtrate acid to a pH of from about 5.5 to about 5.2 and filtering off any precipitate formed thereby, and adjusting the pH of this purified solution to a pH of from about 4.0 to about 1.0 whereupon purified rutin crystallizes from the solution.

3. An improvement in the production of rutin from buckwheat leaf meal which comprises treating the meal with water in the presence of borax whereby a portion of the meal containing the rutin is dissolved and adding enough borax to bring the pH of the solution up to from about 7.0 to 9.0, filtering off from any undissolved material, adding enough water-soluble salt to the filtrate to make a 20% solution of the salt whereby impurities are precipitated, filtering off the precipitate, acidifying the filtrate with phosphoric acid to a pH of from 5.2 to 5.5 and filtering off impurities precipitated thereby, and adjusting the pH of the filtrate with dilute sulfuric acid to a range of from 3.0 to 1.0 whereupon purified rutin crystallizes from the solution.

4. An improvement in the production of rutin from a rutin concentrate derived from buckwheat leaf meal by defatting the meal with an organic solvent, extracting from the defatted material a crude rutin with 78% alcohol and evaporating the alcohol which comprises adding the concentrate with stirring at room temperature to a sufficient quantity of 5% aqueous solution of borax to dissolve practically all of the concentrate to pH 7.5, filtering off from any undissolved material, adding to the filtrate enough sodium chloride with stirring to make a 20% solution of the salt whereby a heavy precipitate of green tars and pigments flocculates which is filtered off, acidifying the filtrate with phosphoric acid to a pH of from 5.2 to 5.5 and filtering off any precipitate formed thereby, heating the filtrate to 50° C. and adding dilute sulfuric acid to the well stirred solution to adjust the pH to from 3.0 to 1.0 and allowing it to cool and stand whereupon purified rutin crystallizes from the solution.

5. An improvement in the production of rutin from plant materials containing it together with a substantial amount of quercetin which comprises dissolving the crude material in water in the presence of a water-soluble borate to a pH of from 7.0 to 10.0, adjusting the pH of the solution to a pH range of from 5.0 to 5.5 whereby the quercetin is precipitated, filtering off the precipitate and acidifying the filtrate to a pH of from 3.0 to 1.0 whereupon purified rutin crystallizes from the solution.

HAROLD FREEMAN KOONES.

REFERENCES CITED

The following references are of record in the file of this patent:

UNITED STATES PATENTS

| Number | Name | Date |
| --- | --- | --- |
| 2,332,548 | Auerbach | Oct. 26, 1943 |
| 2,425,094 | Griffin | Aug. 5, 1947 |